G. W. FIELD.
MILK RETARDER.
APPLICATION FILED MAY 10, 1914.
1,099,790.
Patented June 9, 1914.
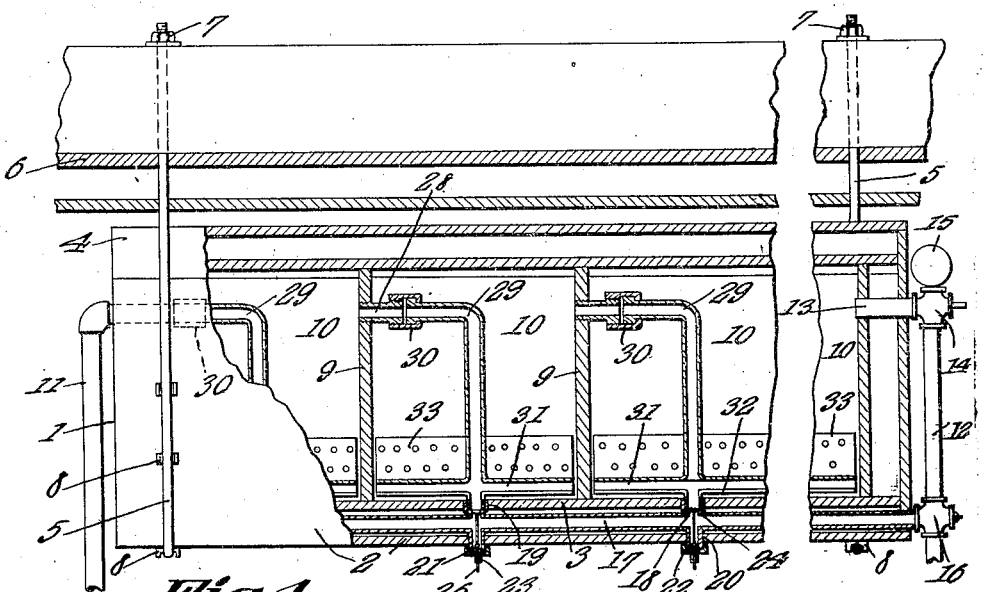
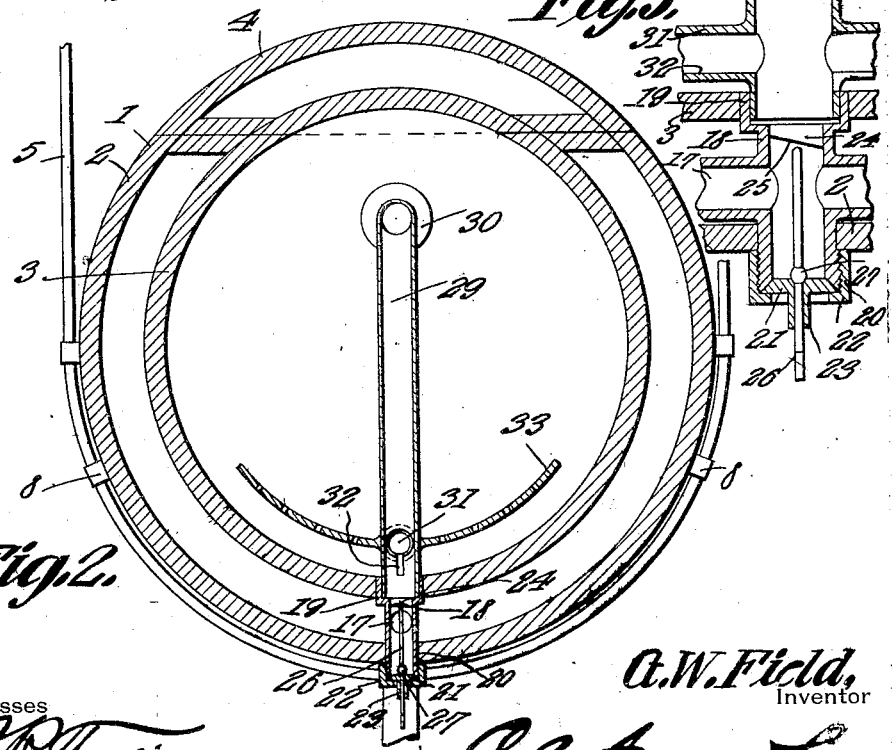
Witnesses
G. W. Field,
Inventor
by C. A. Snow & Co.
Attorneys

UNITED STATES PATENT OFFICE.

GEORGE W. FIELD, OF NORTH BRANCH, NEW JERSEY.

MILK-RETARDER.

1,099,790.

Specification of Letters Patent.    Patented June 9, 1914.

Application filed March 10, 1914. Serial No. 823,828.

*To all whom it may concern:*

Be it known that I, GEORGE W. FIELD, a citizen of the United States, residing at North Branch, in the county of Somerset and State of New Jersey, have invented a new and useful Milk-Retarder, of which the following is a specification.

The present invention appertains to an apparatus for heating or cooling milk, and aims to provide a novel and improved device of that character.

It is the object of the present invention to provide a casing or cylinder through which the milk is adapted to be passed, and novel means within the casing or cylinder for retarding the flow of the milk therethrough.

Another object of the present invention is to provide in combination with the retarding means within the casing or cylinder, unique means for spreading or diffusing the milk as it flows through the casing, whereby the heating or cooling of the milk will be rendered more uniform and effective.

The present invention also contemplates the provision of an apparatus of the nature indicated, wherein the casing or cylinder is provided with a plurality of compartments, through which the milk is arranged to flow successively, means being provided whereby any or all of the compartments or chambers may be drained, and whereby milk may be made to flow through one or more of the compartments, as desired.

It is also within the scope of the present invention to provide a milk cooling or heating apparatus of the character above intimated, which will be improved generally in its construction, whereby the utility of the apparatus will be enhanced.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein—

Figure 1 is a longitudinal vertical section of the improved apparatus, portions being broken away, and portions being shown in full. Fig. 2 is an enlarged cross section of the apparatus. Fig. 3 is an enlarged fragmental sectional detail.

In carrying out the present invention, there is provided a horizontal casing or cylinder 1, which is provided with outer and inner walls 2 and 3, respectively, whereby the interior of the casing may be jacketed with water or with an insulating agent. The top of the casing 1 is removable, so as to provide a cover or lid 4.

The casing or body 1 is preferably supported in an elevated or raised position, by means of U-shaped hangers 5 in which the casing 1 is slung or seated, the upper ends of the hanger 5 engaging through the ceilings or overhead supporting structure 6 and having nuts or other retaining elements 7 engaged to their upper ends. Notched seat elements 8 are preferably secured to the sides and bottom of the casing 1, to engage over the hangers 5 for maintaining the casing against longitudinal movement within the hangers, but enabling the casing to be rotated within the hangers, when necessary or desirable.

The interior of the casing 1 is divided into a plurality or a series of compartments or chambers by means of partitions 9, the compartments or chambers 10 being arranged in a longitudinal series, and being closed one from the other, by the cover 4 which fits tightly over the upper ends of the partitions. The joints between the cover and the sides and ends of the casing 1, as well as the partitions 9, are preferably ground, to prevent leakage.

An inlet or supply pipe 11, which extends from the pasteurizer or pump, extends through one end of the casing 1 adjacent the upper end of the corresponding compartment or chamber 10, while a discharge or outlet pipe 12 leading to the cooler, has a branch 13 engaged through the other end of the casing 1 adjacent the upper end or mouth of the corresponding end compartment 10, a valve 14 being preferably interposed between the discharge pipe 12 and its branch 13. It is desirable to attach a suitable recording gage 15 to the casing of the valve 14, whereby the gage may be observed by the attendant.

The coupling 16, which may be provided with a valve, if desired, is interposed in the discharge or outlet pipe 12, and has attached thereto, a drain pipe 17, extending longitudinally within the bottom portion of the casing 1, between the inner and outer walls thereof. The drain pipe 17 extends under the compartments 10, and is provided at spaced points, with upstanding branches 18, one for each compartment 10. The branches 18 are preferably arranged centrally of the compartments 10, and have their upper or free ends enlarged, as at 19, and engaged through the inner wall 3 of the casing 1, so as to communicate through the bottoms of the compartments 10. The enlarged portions 19 provide sockets or counter bores for the purposes which will hereinafter appear. The pipe 17 is further provided with depending branches 20 below and alining with the upstanding branches 18, and engaging through the outer wall or bottom of the casing 1.

Caps or closures 21 are seated against the lower ends of the branches 20, and are retained in place by means of the flanged retaining nuts 22, extended over the lower or free ends of the branches 20. The caps 21 are provided with depending tubular extensions 23.

Plugs or valves 24 are disposed snugly within the upstanding branches 18 of the drain pipe 17, below the enlarged portions 19, and have their bottoms inclined, as at 25. Stems or spindles 26 are slidable through the caps 21 and their tubular extensions or guides 23, the upper ends of the stems or spindles 26 terminating directly below the inclined bottoms 25 of the plugs or valves 24, and the lower ends of the said stems depend or protrude from the guides 23, in order that the stems may be raised by hand. The stems 26 are provided with enlargements 27 normally seatable upon the caps 21, for supporting the stems or spindles in place, but enabling them to be readily raised as desired. The stems or spindles 26 provide means for releasing or liberating the plugs or valves 24, as will hereinafter appear.

A nipple 28 is engaged through each of the partitions 9 between the compartments 10, adjacent the upper ends of the partition, and an angular or L-shaped inlet pipe 29 is disposed within each of the compartments 10. The upper arm of the inlet pipe 29 within the primary compartment 10, is connected to the end of the supply pipe 11, while the upper ends of the other pipes 29 are connected to the respective nipples 28, by the means of ordinary union couplings 30. The other arms of the inlet pipes 29 depend centrally within the compartments 10, and are provided adjacent their lower extremities with lateral branches or arms 31 arranged longitudinally of the casing, and directly adjacent, but spaced slightly from, the bottoms of the compartments. The lower extremities or end portions of the depending arms of the pipes 29 are normally received by the enlarged portions or sockets 19 of the upstanding branches 18 of the discharge or drain pipe 17, to assist in supporting the pipes 29 and in maintaining them against accidental displacement within the compartments. The branches or arms 31 of the inlet pipes 29 have their free ends terminating directly adjacent, but spaced slightly from, the partitions 9, and are provided with longitudinal slots 32 in their bottoms. The lower slots 32 of the branches or arms 31 extend into the lower portion of the depending arms of the pipes 29, as clearly seen in Figs. 2 and 3.

A transversely concaved spreader or diffuser 33 is arranged within each compartment 10, and is co-extensive with the branches 31 of the corresponding pipe 29, the median portion of the spreader 33 being attached to the said branches 31. The spreader 33 in each compartment is apertured or perforated, and is carried by the branches 31 of the pipe 29, as will be evident. The spreaders 33 are spaced above the bottoms of the compartments 10 and are preferably concentric therewith.

In practice, the supply and discharge pipes 11 and 12, respectively, of the present apparatus, are connected by means of hose or other flexible connections, with the pasteurizer or pump, and the cooler, respectively. The flexible connections will enable the casing or body 1 of the apparatus to be rotated or oscillated within the hangers 5, for purpose of cleaning and sterilizing the present apparatus, as will hereinafter more fully appear. It is preferable to provide a casing 1 with five of the compartments 10, although the number of the compartments may be increased or diminished, according to the circumstances. It has been found, however, that with the present apparatus, it requires approximately four minutes of time for the milk to flow through one of the compartments, whereby when five compartments are utilized, it will take approximately twenty minutes for the milk to traverse the present apparatus, which is the usual practice.

In operation, when the milk is fed, either by gravity, or under pressure, through the supply pipe 11, the same will flow into the first compartment 10 through the primary inlet pipe or tube 29, which is connected directly to the supply pipe 11. Then, as the first compartment becomes filled, the milk will flow through the first nipple 28 and the corresponding pipe 29 into the second compartment, it being understood that under ordinary conditions, the stoppers or valves 24 will be closed, to prevent the discharge of the milk through the pipe 17. Thus, as the milk is admitted into the casing 1, the successive compartments 10 will be filled and finally, the milk will be discharged through the outlet or discharge pipe 12. Now, as the milk flows down each of the pipes 29, the same will be divided and passed into the branches 31 of the said pipe, the branches 31 preferably being of a smaller diameter than the body or main portion of the pipes 29. From the branches 31, the milk will flow downwardly through the slots 32 and upwardly around the spreaders or diffusers 33. The spreaders 33 are apertured or perforated to permit the milk to descend therethrough, thereby enhancing the diffusing function of the spreaders. It will thus be obvious, that the milk being discharged through the lower slots of the branches 31, and passing around and through the spreaders 33, will become thoroughly mixed or diffused, to facilitate the heating or cooling of the milk, whichever is the case.

It is evident that either cold or hot water may be circulated through the jacket of the casing 1, it being the object of the present invention, however, to provide an apparatus for effectively heating and assimilating the milk, it being evident that when the casing 1 is heated, the milk being heated, and diffused within the compartment, will become thoroughly and uniformly heated, to the ends desired. It is also possible to place an insulating agent within the jacket of the casing, whereby when heated milk is supplied into the casing, the same may be retained at its original or normal temperature. When it is desired to employ less than the whole number of the compartments or chambers 10, the desired number of compartments may be cut out, by releasing one or more of the stoppers or plugs 24, which will enable the milk to escape through the drain pipe 17 to the outlet or discharge pipe 12, without passing through the compartments 10 beyond the stopper 24 which has been opened or liberated. To open or release one of the stoppers or valves 24, it is merely necessary to raise the corresponding stem or spindle 26 upwardly, whereby the upper end of the stem engaging the inclined bottom 25 of the stopper will raise or slide the stopper. It will be evident that as the stopper is raised, one side thereof will be released first, from the upstanding branch 18 of the pipe 17, whereby the stopper will tilt within the enlarged or socketed portion 19 so as to open the passage through the branch 18 for the purposes noted. When the stopper 24 has been opened, communication will be established directly from the corresponding pipe 29 through the drain pipe 17. Thus, when it is desired to have the milk flow through only one of the compartments 10, the stopper 24 of the second compartment 10 is opened, whereby the milk will be prevented from flowing through the second and successive compartments. Similarly, when the stopper of the third compartment is opened, milk will flow through the first and second compartments, but not through the third one. In order to drain the compartments 10, after the completion of the cooling or heating of the milk, the successive stoppers 24 of the compartments are opened, whereby the compartments may be drained through the drain pipe 17, one at a time, or in regular order.

The present device may be readily cleaned and sterilized after the compartments have been drained, by removing the cover 4, and then rotating the casing 1 to enable access to be had to the several compartments. It is then an easy matter to remove the pipes 29 and the spreaders 33 carried thereby, by opening the union couplings 30. The lower extremities of the pipes 29 may be readily slipped out of engagement with the enlarged portions 19 of the branches 18 of the drain pipe 17. After the pipes 29 have been withdrawn, the stoppers 24 may be removed, as well as the stems 26, if desired. The compartments and pipes, and other parts of the apparatus may be readily cleaned and sterilized, and after the same are cleaned, the parts may be readily assembled for a new operation.

The present apparatus is sanitary or hygienic, and is of advantage in other obvious respects as will be apparent from the foregoing taken in connection with the drawing.

Having thus described the invention, what is claimed as new is:

1. In an apparatus of the character described, a series of compartments, inlet pipes establishing communication between the successive compartments and depending within the respective compartments, the inlet pipes being branched at their lower ends.

2. In an apparatus of the character described, a series of compartments, inlet pipes establishing communication between the successive compartments and depending within the respective compartments, the inlet pipes being branched at their lower ends, and the said branches having lower slots.

3. In an apparatus of the character described, a series of compartments, inlet pipes establishing communication between the successive compartments and depending within the respective compartments, the inlet pipes being branched at their lower ends, and the said branches having lower slots, and spreaders coöperating with the said branches.

4. In an apparatus of the character described, a series of compartments, inlet pipes establishing communication between the successive compartments and depending within the respective compartments, the inlet pipes being branched at their lower ends, and the said branches having lower slots, and apertured spreaders carried by the said branches.

5. In an apparatus of the character described, a horizontally arranged cylindrical casing having a longitudinal series of compartments, inlet pipes establishing communication between the successive compartments and depending within the respective compartments, the inlet pipes having lateral branches adjacent the bottoms of the compartments, the branches having lower slots, and transversely concaved and perforated spreaders carried by the said branches.

6. In an apparatus of the character described, a series of compartments, inlet pipes disposed in the respective compartments and establishing communication between the successive compartments, the inlet pipes extending downwardly within the respective compartments, and having discharge means adjacent the bottoms of the compartments, a drain pipe extending along the bottoms of the compartments and communicating with the lower ends of the inlet pipes, and means for normally closing the passages from the said inlet pipes through the drain pipes.

7. In an apparatus of the character described, a series of compartments, inlet pipes disposed in the respective compartments and establishing communication between the successive compartments, the inlet pipes extending downwardly within the respective compartments, and having discharge means adjacent the bottoms of the compartments, a drain pipe extending along the bottoms of the compartments and having upstanding branches communicating with the lower ends of the said inlet pipes, and valves for normally closing the passages through the said branches.

8. In an apparatus of the character described, a series of compartments, inlet pipes within the respective compartments and establishing communication between the successive compartments, the inlet pipes extending downwardly within the respective compartments and having discharge means adjacent the bottoms of the compartments, a drain pipe extending along the bottoms of the compartments and having upstanding branches which engage through the bottoms of the compartments, the lower ends of the inlet pipes being engaged to the said branches, and means for normally closing the passages from the said inlet pipes through the drain pipe.

9. In an apparatus of the character described, a series of compartments, removable inlet pipes within the respective compartments, and establishing communication between the successive compartments, the said pipes extending downwardly within the compartments and having discharge means adjacent the bottoms of the compartments, a drain pipe extending along the bottoms of the compartments and having upstanding branches engaged through the bottoms of the compartments, the lower ends of the said inlet pipes being removably engaged to the said branches, and means for normally closing the passages from the said inlet pipes through the drain pipe.

10. In an apparatus of the character described, a series of compartments, inlet pipes within the respective compartments and establishing communication between the successive compartments, the inlet pipes extending downwardly within the compartments and having discharge means adjacent the bottoms of the compartments, a drain pipe extending along the bottoms of the said compartments and having upstanding branches, the said branches having enlarged portions engaged through the bottoms of the compartments and receiving the lower ends of the said inlet pipes, stoppers disposed within the said branches below the enlarged portions thereof, and stems slidably carried by the drain pipe and coöperable with the said stoppers for dislodging them.

11. In an apparatus of the character described, a double walled casing having a series of compartments therein, inlet pipes within the respective compartments and establishing communication between the successive compartments, the inlet pipes extending downwardly within and having discharge means adjacent the bottoms of the compartments, a drain pipe disposed between the walls of the casing and extending along the bottoms of the compartments, the drain pipe having upstanding and depending branches engaging through the inner and outer walls of the casing, the lower ends of the said inlet pipes being engaged to the upstanding branches of the drain pipe, valves within the said upstanding branches, and valve opening means engaged through the said depending branches of the drain pipe and coöperating with the said valves.

12. In an apparatus of the character described, U-shaped hangers, a cylindrical casing slung within the said hangers, the casing having a removable top and a series of compartments therein, and removable inlet pipes within the respective compartments establishing communication between the successive compartments, the inlet pipes having discharge means adjacent the bottoms of the compartments.

In testimony that I claim the foregoing as my own, I have hereto affixed my signature in the presence of two witnesses.

GEORGE W. FIELD.

Witnesses:
  ALBERT H. BENDER,
  MINNIE J. LOCHES.